United States Patent
Manimala

(10) Patent No.: US 11,798,524 B2
(45) Date of Patent: Oct. 24, 2023

(54) ACOUSTIC DAMPER

(71) Applicant: THE BOARD OF REGENTS FOR THE OKLAHOMA AGRICULTURAL AND MECHANICAL COLLEGES, Stillwater, OK (US)

(72) Inventor: James Mathew Manimala, Stillwater, OK (US)

(73) Assignee: The Board of Regents for the Oklahoma Agricultural and Mechanical Colleges, Stillwater, OK (US)

( * ) Notice: Subject to any disclaimer, the term of this patent is extended or adjusted under 35 U.S.C. 154(b) by 543 days.

(21) Appl. No.: 16/998,578

(22) Filed: Aug. 20, 2020

(65) Prior Publication Data
US 2021/0056945 A1    Feb. 25, 2021

Related U.S. Application Data

(63) Continuation-in-part of application No. 16/546,056, filed on Aug. 20, 2019, now Pat. No. 11,568,845.

(60) Provisional application No. 62/889,346, filed on Aug. 20, 2019.

(51) Int. Cl.
| | |
|---|---|
| *G10K 11/16* | (2006.01) |
| *F24F 13/24* | (2006.01) |
| *B64D 29/00* | (2006.01) |
| *B64D 33/02* | (2006.01) |

(52) U.S. Cl.
CPC ............ *G10K 11/161* (2013.01); *B64D 29/00* (2013.01); *F24F 13/24* (2013.01); *B64D 2033/0206* (2013.01); *F24F 2013/242* (2013.01)

(58) Field of Classification Search
CPC .................. G10K 11/161; B64D 29/00; B64D 2033/0206; F24F 13/24; F24F 2013/242
See application file for complete search history.

(56) References Cited

U.S. PATENT DOCUMENTS

| | | | | |
|---|---|---|---|---|
| 3,552,294 A | * | 1/1971 | Goldberg | F24F 13/0236 454/333 |
| 3,605,797 A | * | 9/1971 | Dieckman | F24F 13/0263 454/305 |
| 3,853,143 A | * | 12/1974 | De Lepeleire | F24F 11/74 137/802 |
| 4,113,176 A | * | 9/1978 | Caknis | F24F 11/74 454/264 |
| 4,191,242 A | * | 3/1980 | Kumagai | B60H 1/00985 237/12.3 B |
| 4,537,117 A | * | 8/1985 | Cavestany | B60H 1/00364 454/275 |
| 5,663,535 A | * | 9/1997 | MacDonald | F24F 13/24 181/255 |
| 11,514,878 B2 | * | 11/2022 | Semperlotti | G10K 11/172 |
| 2002/0036115 A1 | * | 3/2002 | Wilson | F02C 7/045 181/290 |
| 2004/0182941 A1 | * | 9/2004 | Alles | F24F 13/10 236/51 |

* cited by examiner

Primary Examiner — Forrest M Phillips
(74) Attorney, Agent, or Firm — McAfee & Taft

(57) ABSTRACT

An acoustic damper has a sound pickup unit defining a plurality of pickup unit passageways. Hollow flexible tubes are connected to exit openings of the pickup unit passageways and extend outwardly therefrom. The hollow flexible tubes and pickup unit passageways define acoustic paths.

21 Claims, 11 Drawing Sheets

FIG.16

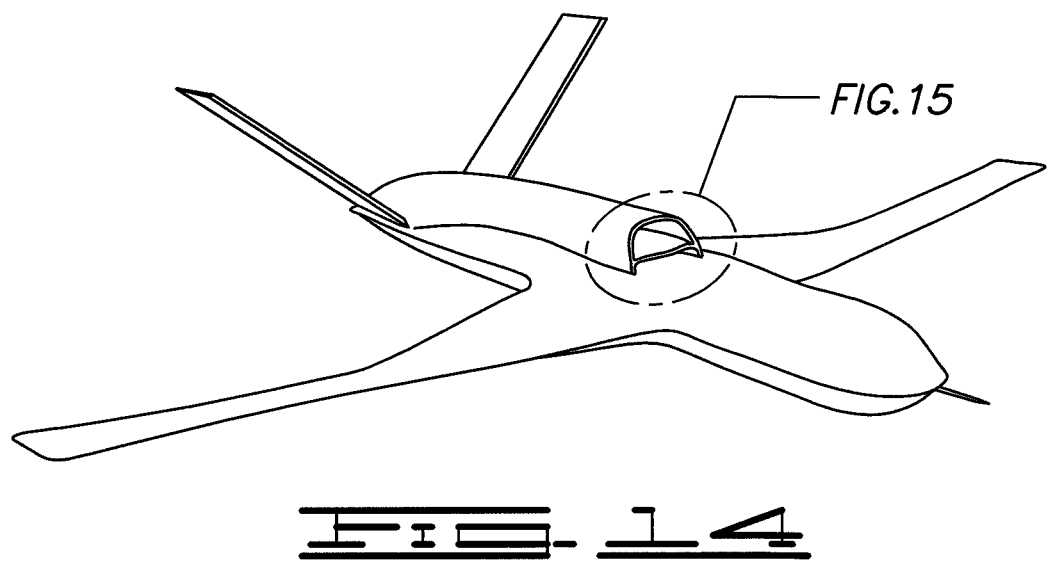
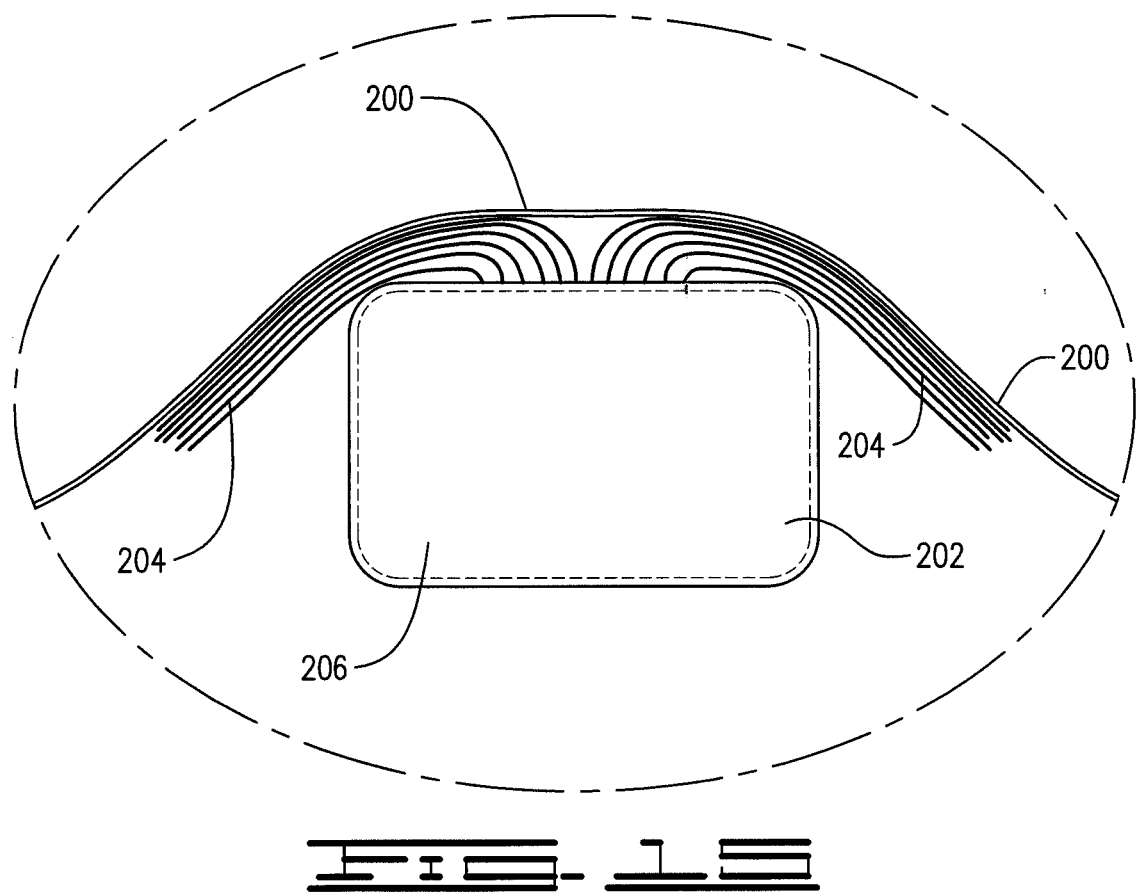

ACOUSTIC DAMPER

CROSS REFERENCE TO RELATED APPLICATION

This application claims priority from U.S. Provisional Application 62/889,346 filed Aug. 20, 2019, and U.S. patent application Ser. No. 16/546,056 filed Aug. 20, 2019.

SUMMARY

An acoustic damper comprises a sound pickup unit defining a plurality of pickup unit passageways. Hollow flexible tubes are connected to exit openings of the pickup unit passageways and extend outwardly therefrom. The hollow flexible tubes and pickup unit passageways define acoustic paths.

The pickup unit may comprise a cap defining a plurality of generally straight cap passageways with an entry opening and an exit opening and a baffle block connected to the cap. The baffle block defines a plurality of baffle block passages with an entry opening and an exit opening and the cap passageways are communicated with the baffle block passages. The cap passageways and baffle block passages define the pickup unit passageways, and the flexible hollow tubes are connected to the baffle block exit openings.

The pickup unit has a face sheet covering the cap, and the face sheet has face sheet apertures communicated with the pickup unit passages. The hollow flexible tubes may be of different lengths and may be a plurality of bundles of flexible hollow tubes.

An air conditioning unit comprises an outer housing, a compressor positioned in the outer housing and an acoustic damper as described in the preceding paragraphs positioned in the housing. The pickup unit is positioned proximate the compressor and the hollow flexible tubes positioned in dead spaces in the housing.

An acoustic damper comprises a rigid pickup unit having a plurality of sound pickup passages therethrough. A plurality of hollow flexible tubes are connected to the rigid pickup unit and the pickup passages are communicated with the hollow flexible tubes to define a plurality of acoustic pathways. A plug closes off an outward end of the flexible tubes and a bulk absorber fills a portion of the hollow flexible tube at the outward end thereof.

An air conditioning unit may comprise an outer housing, a compressor in the outer housing and the rigid pickup unit described above positioned proximate the compressor. The rigid pickup unit may have an arcuate shape. The air conditioning unit housing may define a plurality of cavities therein, and the flexible tubes connected to the hollow cavities.

BRIEF DESCRIPTION OF DRAWINGS

FIG. 14 is a schematic of an airplane and FIG. 15 is an additional embodiment of an acoustic damper in a noise-generating structure.

DESCRIPTION OF AN EMBODIMENT

Figure 1:
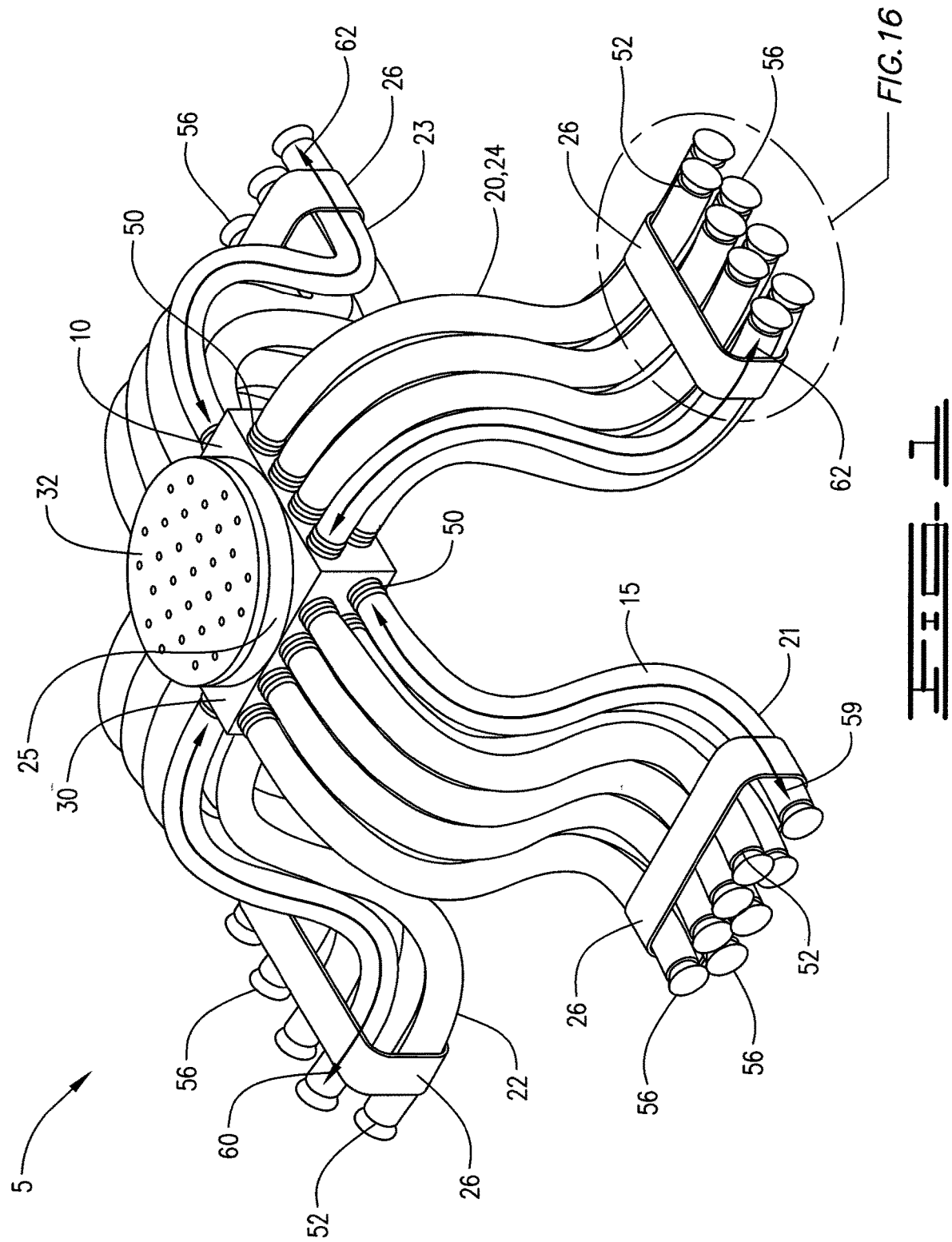
FIG. 1 is a perspective view of an acoustic damper of the current disclosure.
Figure 2:
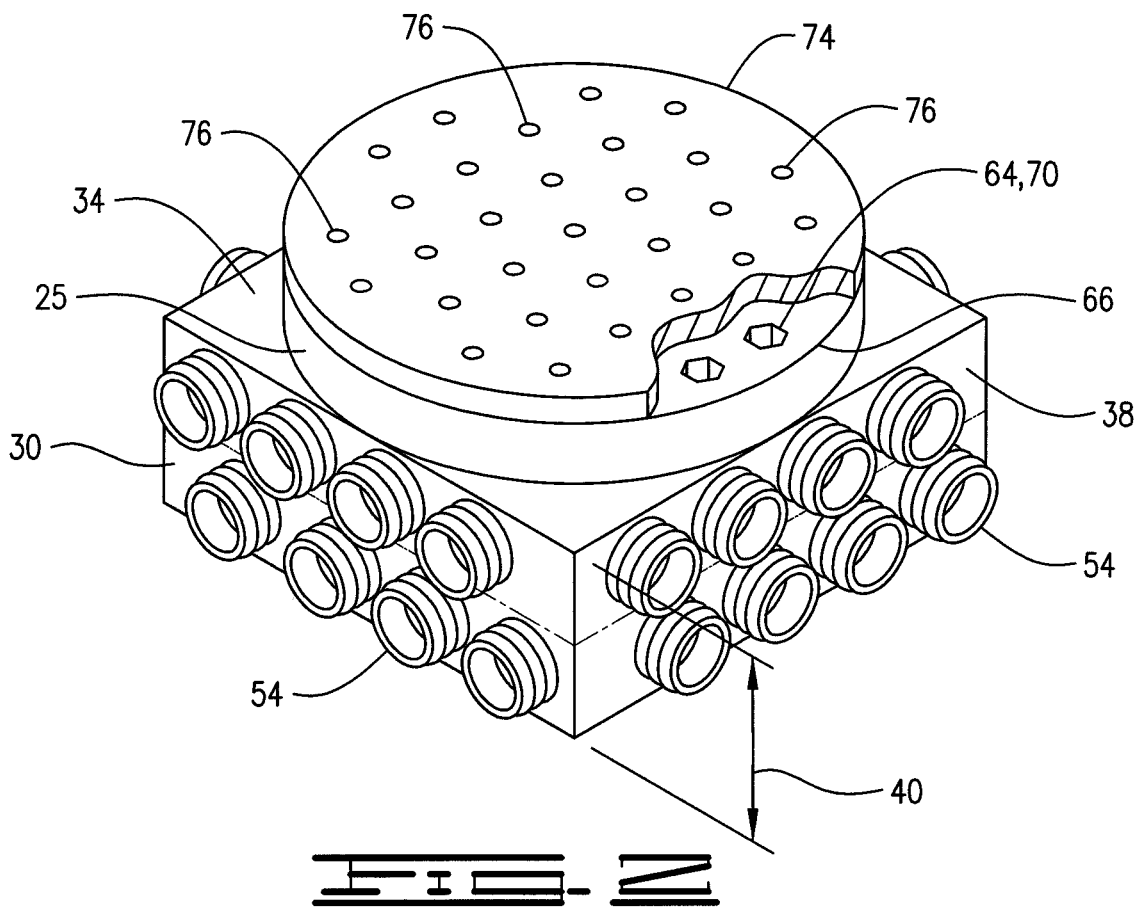
FIG. 2 is a perspective view of a sound pickup unit of the current disclosure.

An acoustic damper 5 includes a sound pickup unit 10 with a plurality of hollow flexible tubes 15 connected thereto and extending therefrom. The acoustic damper 5 is configured to attenuate or damp sound at specified frequencies. In particular, acoustic damper 5 may be utilized to attenuate sound having an ultra-low-frequency or ULF dominant content below 300 Hz, and in particular below 100 Hz and in some cases as low as few tens of Hz without incurring impractically high weight or volume penalties in applications where only irregularly shaped structural pockets are available for acoustic treatment. Acoustic damper 5 is also effective to attenuate sound at frequencies above 300 Hz and can be deployed in conjunction with conventional acoustic treatments such as bulk absorbers. This is accomplished by utilizing flexible tubes having tunable combinations of lengths with bulk absorber inserts. The length of the path through which a sound wave travels may be referred to herein as an acoustic path, and by providing different length flexible tubes, acoustic paths of different lengths are provided to attenuate sounds of different frequencies. Thus, the acoustic damper is effective to mitigate sound over a wide range of frequencies but specifically provides a space-efficient solution to mitigate ultra-low-frequency sound as low as tens of Hz for which other practical solutions are as yet unavailable.

Hollow flexible tubes 15 may be grouped in bundles 20 which in the embodiment shown in FIG. 1 may include bundles 21, 22, 23 and 24. The length of each flexible hollow tube 15 in a single bundle may be the same. The lengths of the hollow flexible tubes 15 in different bundles 20 may be different to attenuate sound at different frequencies. For example, the length of flexible tubes 15 in bundles 21 and 23 may be the same, but different from the lengths of the hollow flexible tubes 15 in bundles 22 and 24. It is understood that the discussion regarding lengths is exemplary, and the lengths of hollow flexible tubes 15 can be tuned as desired to address the frequencies of concern. Thus, all lengths of flexible hollow tubes may be the same or the lengths in a single bundle may vary. Bundles 20 may be held together with a strap 26 or other known means.

Sound pickup unit 10 may comprise a circular cap 25 connected to a baffle block 30. Baffle block 30 has a top face 34, a bottom face 36 and an outer peripheral edge 38. A face sheet 32 may be positioned on cap 25. Baffle block 30 has pins 39 extending from top face 34. In the embodiment shown baffle block 30 is a generally rectangular and more specifically a square-shaped baffle block. However, it is understood that any number of shapes may be utilized for the cap 25 and the baffle block 30 depending upon the shape and size of the area available near the sound-producing source from which the sound to be attenuated is emitted. Baffle block 30 defines a thickness 40 between top face 34 and bottom face 36. In the embodiment of FIG. 1, bottom face 36 is a bottom face with no openings therethrough.

A plurality of baffle block passages 42 are defined through baffle block 30. Baffle block passages 42 have an entry opening 44 on the top face 34 thereof. Top face 34 may also be referred to as the entry face 34. Baffle block passages 42 likewise have exit opening 46. In the embodiment shown in FIG. 1, exit openings 46 are defined on the outer peripheral edge 38 of baffle block 30. The entry openings 44 may be generally in the shape of a polygon and in the embodiment shown are hexagonal. The exit openings 46 of each baffle block passage 42 are circular to allow the connection of hollow flexible tubes 15 thereto. It is understood that other shapes are possible for the baffle block passages 42, and the entry and exit openings 44 and 46 and the description herein is not limiting.

Figure 3:
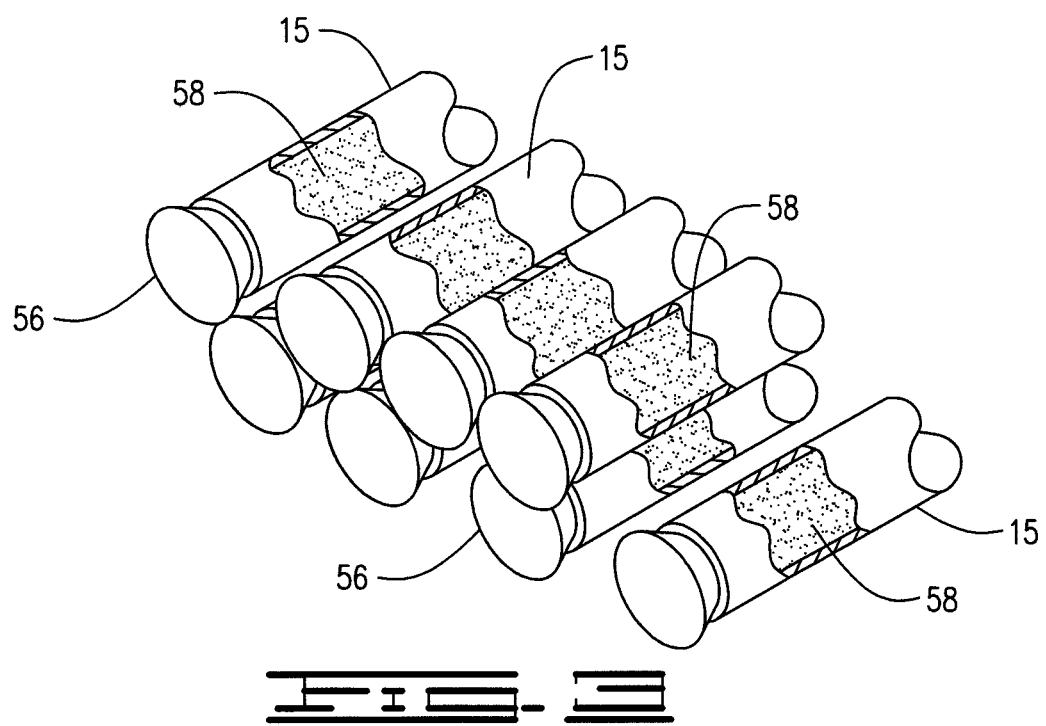
FIG. 3 is a view showing an interior of hollow flexible tube ends.
Figure 4:
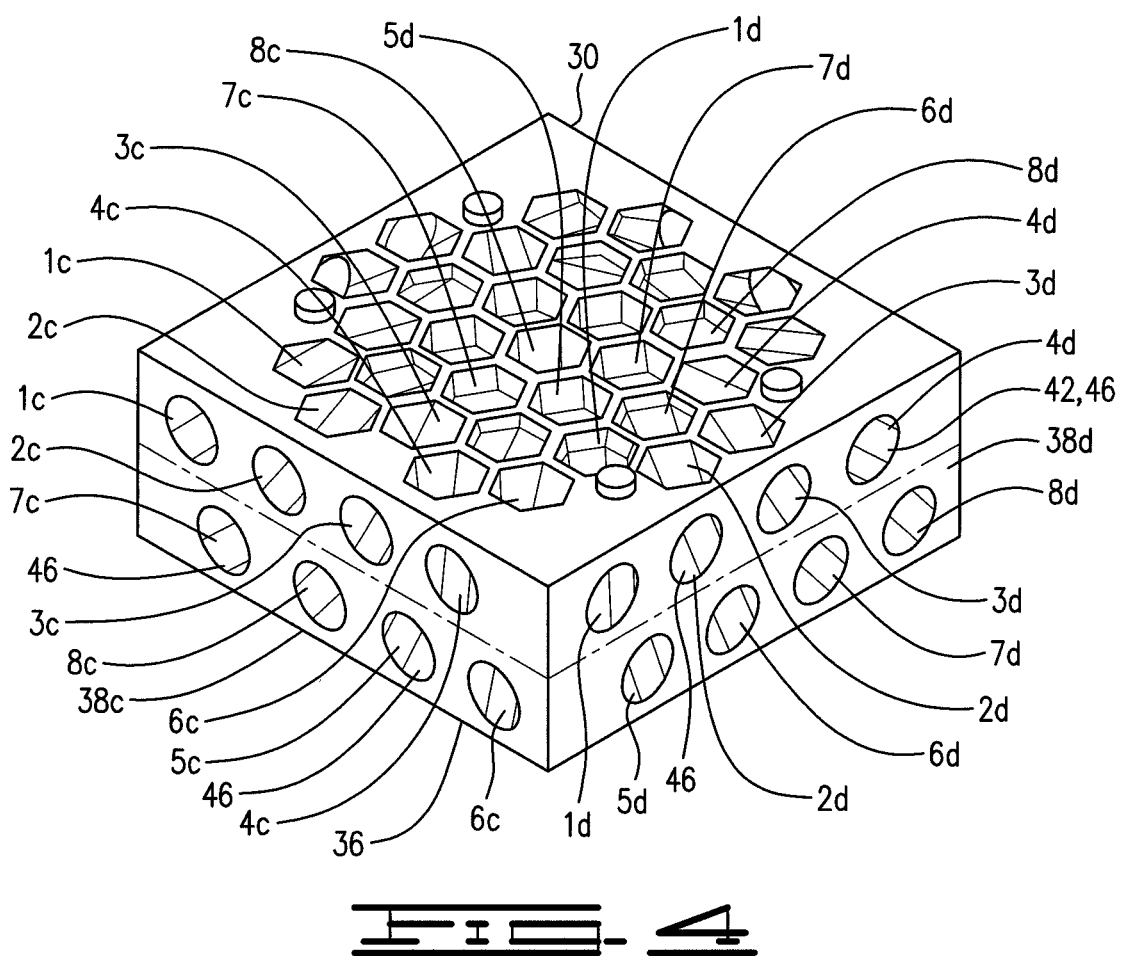
FIG. 4 is a perspective view of two sides of the baffle block.
Figure 5:
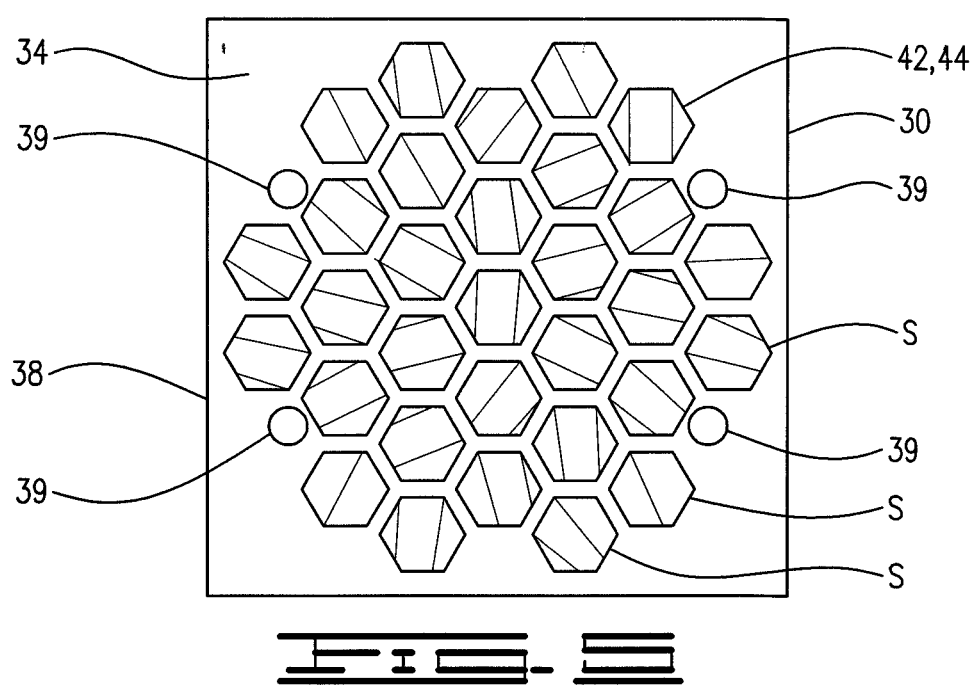
FIG. 5 is a top view of the baffle block.
Figure 6:
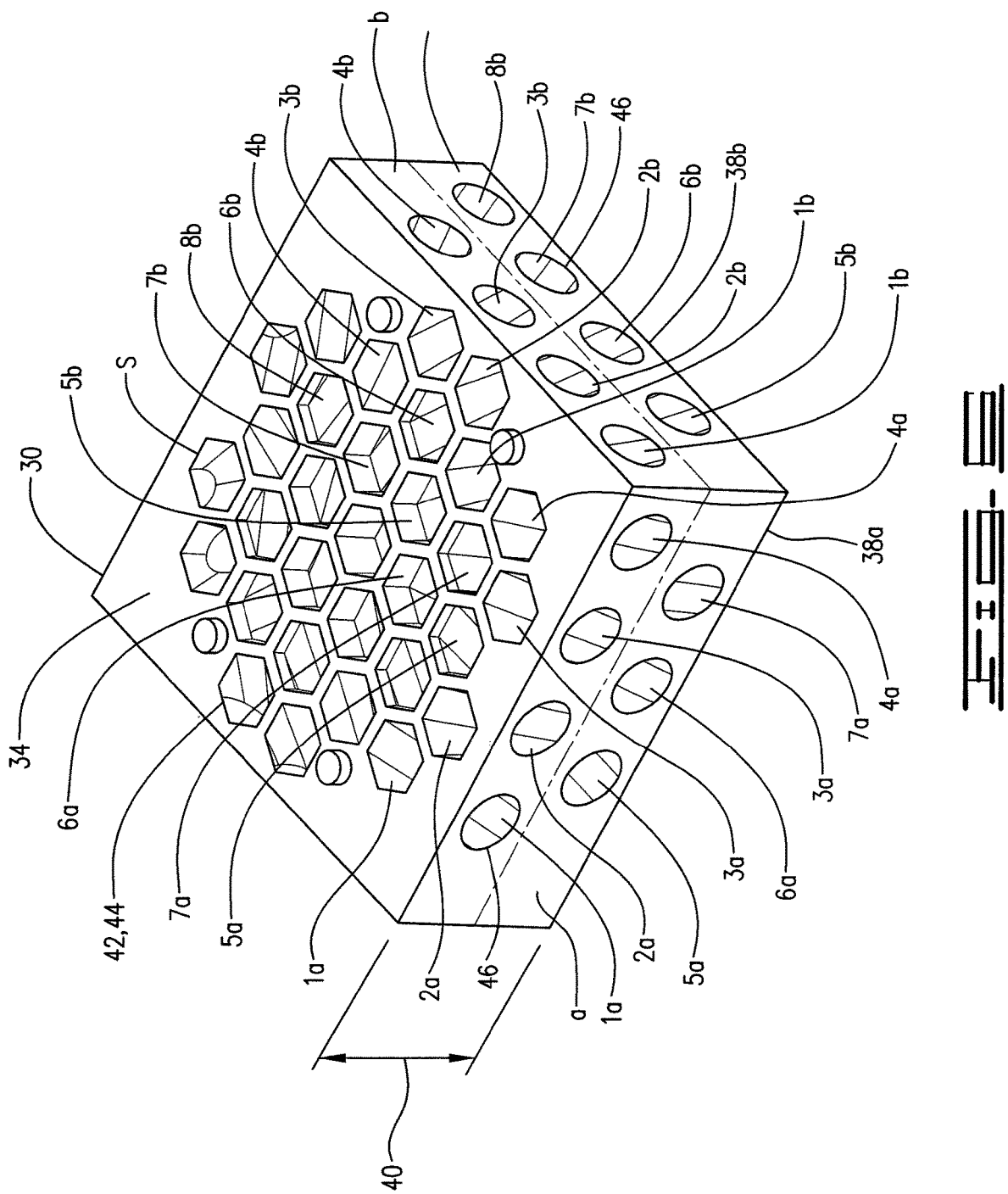
FIG. 6 is a perspective of the two sides of the baffle block not shown in FIG. 4.
Figure 7:
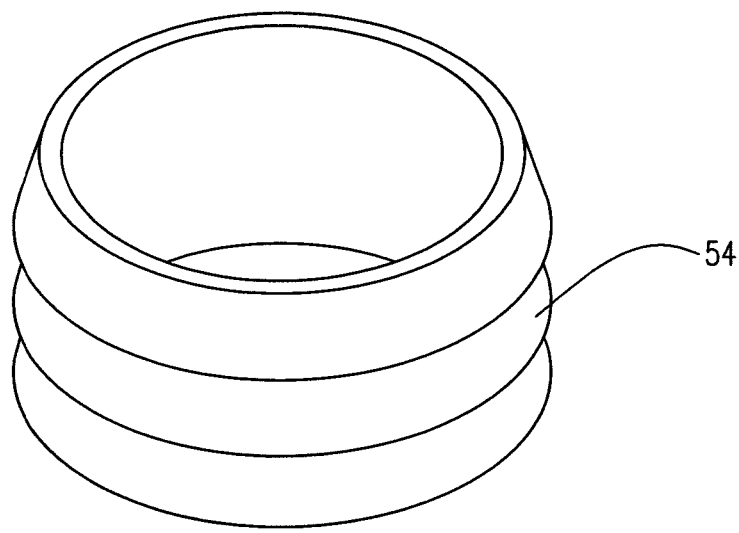
FIG. 7 is a perspective of a connecting nipple.
Figure 8:
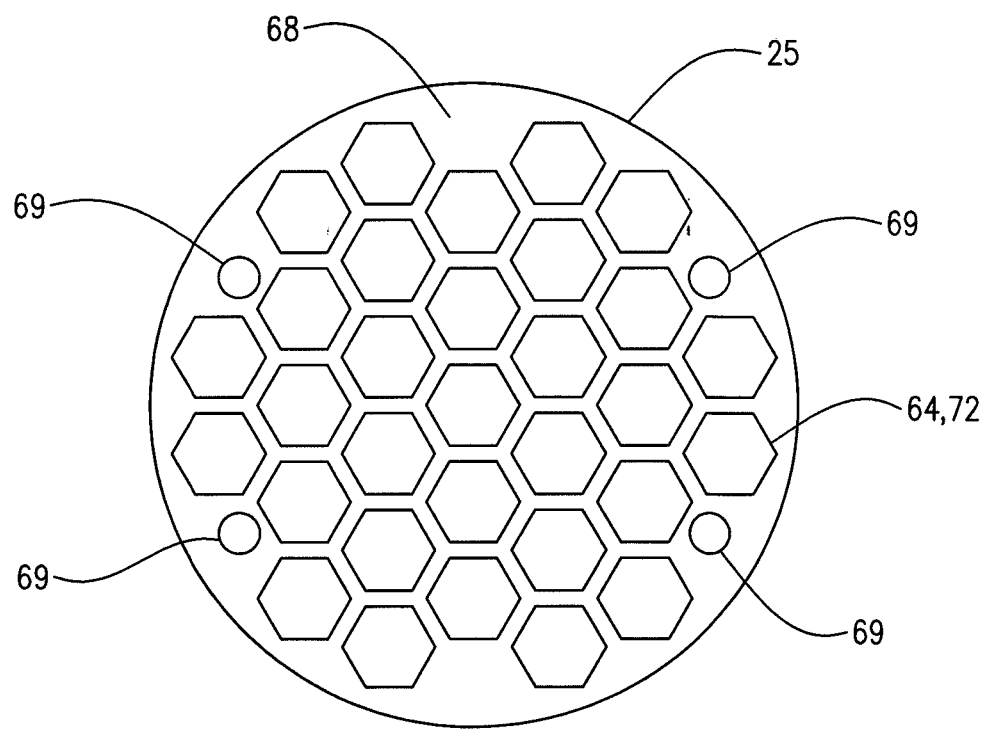
FIG. 8 is a bottom view of the cap for the sound pickup unit.

Each of hollow flexible tubes 15 has a first end 50 that is connected at exit opening 46 in baffle block 30. Flexible tubes 15 have a second end 52. First end 50 may be connected to baffle block 30 with a corrugated nipple 54 that is inserted into the exit openings 46 on baffle block 30. First end 50 of hollow flexible tubes 15 can then be pressed on to the portion of nipple 54 extending from openings 46. FIGS. 3 and 4 have identifying numerals to show the entry and exit openings of each baffle block passage 42. In the embodiment described there are thirty-one baffle block passages 42. The exit openings 46 are on peripheral edge 38. The sides of peripheral edge 38 are designated 38a-38d in FIGS. 4 and 5, and the openings are designated with subscripts to show the passages. In other words, entry 1c and exit 1c are connected by a passage 42, as are 2c and 2c, 3c and 3c and so on.

In some embodiments second end 52 may have a plug 56 therein. Hollow flexible tubes 15 may also have a foam insert 58 therein at the second end thereof extending from the plug 56 toward the first end 50 of the hollow flexible tubes 15. The foam insert 58 is a bulk absorber designed to absorb sound and may comprise for example open-cell (porous) foams such as polyurethane or melamine foams. Insert 58 may also be comprised of hybrid materials, as from 3D printed foams or structures. Foam insert 58 will extend only a short distance from second end 52.

Each of hollow flexible tubes 15 has a length extending between the first end 50 and the second end 52 thereof. For example, hollow flexible tubes 15 in bundle 21 may have a length 59. Hollow flexible tubes 15 in bundle 22 may have a length 60. Hollow flexible tube 15 in bundle 23 may have a length 61 and hollow flexible tubes 15 in bundle 24 may have a length 62. Depending upon the available space and desired configuration lengths 59, 60, 61 and 62 may be identical or, for example, lengths 59 and 61 may be the same and lengths 60 and 62 the same but different from lengths 59 and 61. The lengths 59, 60, 61 and 62 may all be different as well. It is understood that the lengths of individual tubes can be varied to address frequency ranges of interest.

Cap 25 is mounted to baffle block 30 in a manner known in the art. For example, the cap 25 may be adhesively bonded to baffle block 30. Cap 25 has cap openings or cap passageways 64 that extend from a top or entry face 66 to a bottom or exit face 68. Cap 25 has alignment openings 69 on bottom face 68 to receive pins 39 on baffle block 30 so that cap passageways 64 align with baffle block passages 42. Cap passageways 64 have an entry opening 70 and an exit opening 72. Cap passageways 64 in the embodiment shown have a shape that matches the shape of the entry opening 44 of baffle block passageways 42. Thus, cap passageway 64 is a polygonal shape and in the embodiment shown is hexagonal. Cap passageways 64 will align with baffle block passages 42. Cap passageways 64 and baffle block passages 42 define pickup unit passageways 73.

A face sheet 74 is positioned on top face 66 of cap 25 and has a plurality of apertures 76 therethrough. Apertures 76 are small and provide an opening through which sound waves can enter pickup unit passageways 73. Each of apertures 76 align with an entry opening 70 of cap passageways 64.

Figure 9:
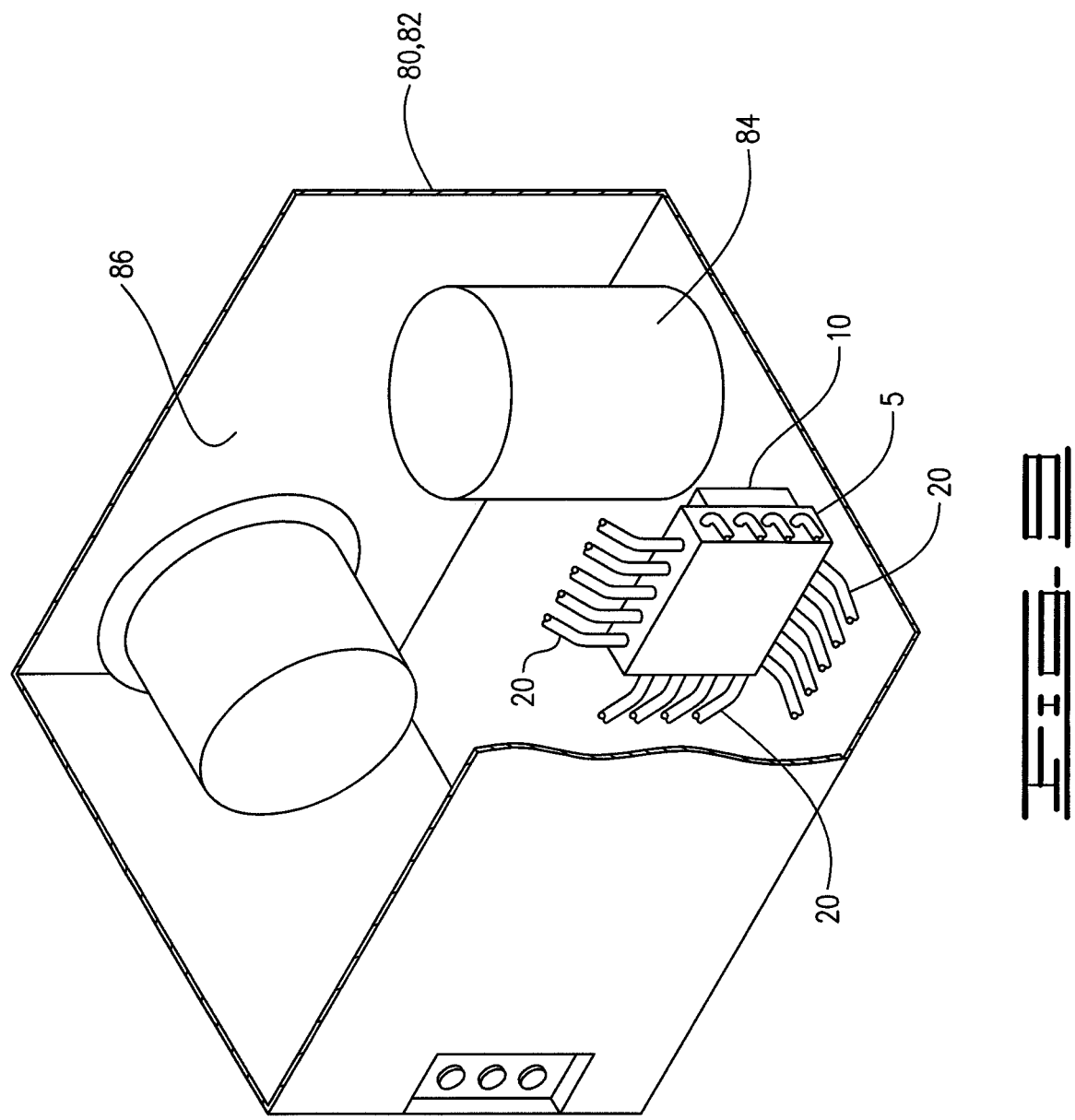
FIG. 9 is a schematic showing an acoustic damper positioned in a noise-generating structure.

The acoustic damper 5 disclosed herein is useful in any noise-generating structure to damp or attenuate sound emitting therefrom. For example, acoustic damper 5 may be used in a noise-generating structure 80 that has an outer housing with a noise source positioned in the housing. For example, heating, ventilating and air conditioning (HVAC) structures often generate noise that is unacceptable for certain uses. One example of such a noise-generating structure is an air conditioner. An air conditioner 80 is a unitary air conditioning system and is schematically shown in FIG. 9. Air conditioner 80 has a housing 82 with a compressor 84 therein. Compressor 84 is a noise source that generates noise at frequencies spanning a wide range but encompassing dominant ultra-low-frequencies (<~300 Hz) content. Compressors can often generate noise having a frequency of less than 300 Hz and sometimes less than 100 Hz. As a result, such air conditioners may not be useful in certain settings where little sound is desirable. The acoustic damper 5 may be placed in the housing proximate the noise generating source, or compressor 84. Hollow flexible tubes 15 may be routed in and through dead spaces 86 in housing 82. It is understood that a number of additional air conditioner components will be positioned in housing 82, and hollow flexible tubes 15 will be routed in the dead spaces existing around the compressor and other equipment individually, or in bundles 20 as described herein.

Each hollow flexible tube 15 and its corresponding pickup unit passage 73 will comprise an acoustic path (AP). Thus, in the described embodiment an acoustic path will have a length equal to the length of the hollow flexible tube 15 plus the distance from the entry opening 70 on cap 25 to the exit opening 46 on baffle block 42 for the pickup unit passageway 73 to which the hollow flexible tube 15 is connected. As shown in the figures, the majority of the length of an acoustic path is defined by the hollow flexible tubes 15. The lengths of acoustic paths may be varied in order to address the frequency ranges of concern.

In certain scenarios, the frequency ranges of the sound to be attenuated may include high frequencies and low frequencies. As a result, different lengths of hollow flexible tubes may be desired. There are a number of known methods for determining the length of an acoustic path needed to attenuate sound in a frequency range of interest. For example, use of a Zwikker-Kosten Transmission Line Code (ZKTL) based optimization tool may be utilized to determine appropriate acoustic path lengths. The application of the ZKTL based tool will provide the information and result necessary to determine the combination of tubes of specific acoustic path lengths necessary to optimally address frequencies in the range of interest. Thus, as identified earlier, the lengths of hollow flexible tubes 21, 22, 23 and 24 may vary so as to mitigate or damp sound having different frequencies. The size and shape of the hexagonal openings in the cap 25 can vary as well, as can the circular exit openings in baffle blocks 30. Apertures 76 in face sheet 74 will be much smaller than the size of the openings. In one non-limiting example, the hexagonal openings in cap 25 and baffle block 30 may have a side (identified by the letter S in the figures) length of approximately 0.288 inches. The circular exit opening 46 on baffle block 30 may have a diameter of about 0.50 inches, and the face sheet aperture may have a diameter of about 0.075 inches. The diameter of the tube may be, for example, 0.625 inches, and the length 24 inches. In one example, using components with the dimensions identified above, the damper unit 5 mitigated sound having a frequency of about 100 Hz.

The acoustic damper disclosed herein will mitigate sound across a broad range of frequencies. Sound with frequencies in the lower range, for example below 300 Hz, and below 100 Hz, is mitigated by travelling through the acoustic paths defined by the hollow flexible tubes and pickup unit. Because many noise-generating sources create sound over a broad range of frequencies, it is desirable to mitigate sound having frequencies in different ranges. Bulk absorbers as described herein are effective at mitigating sound with frequencies above 1000 Hz. Thus, the acoustic damper disclosed effectively mitigates sound having frequencies above and below 1000 Hz.

Figure 10:
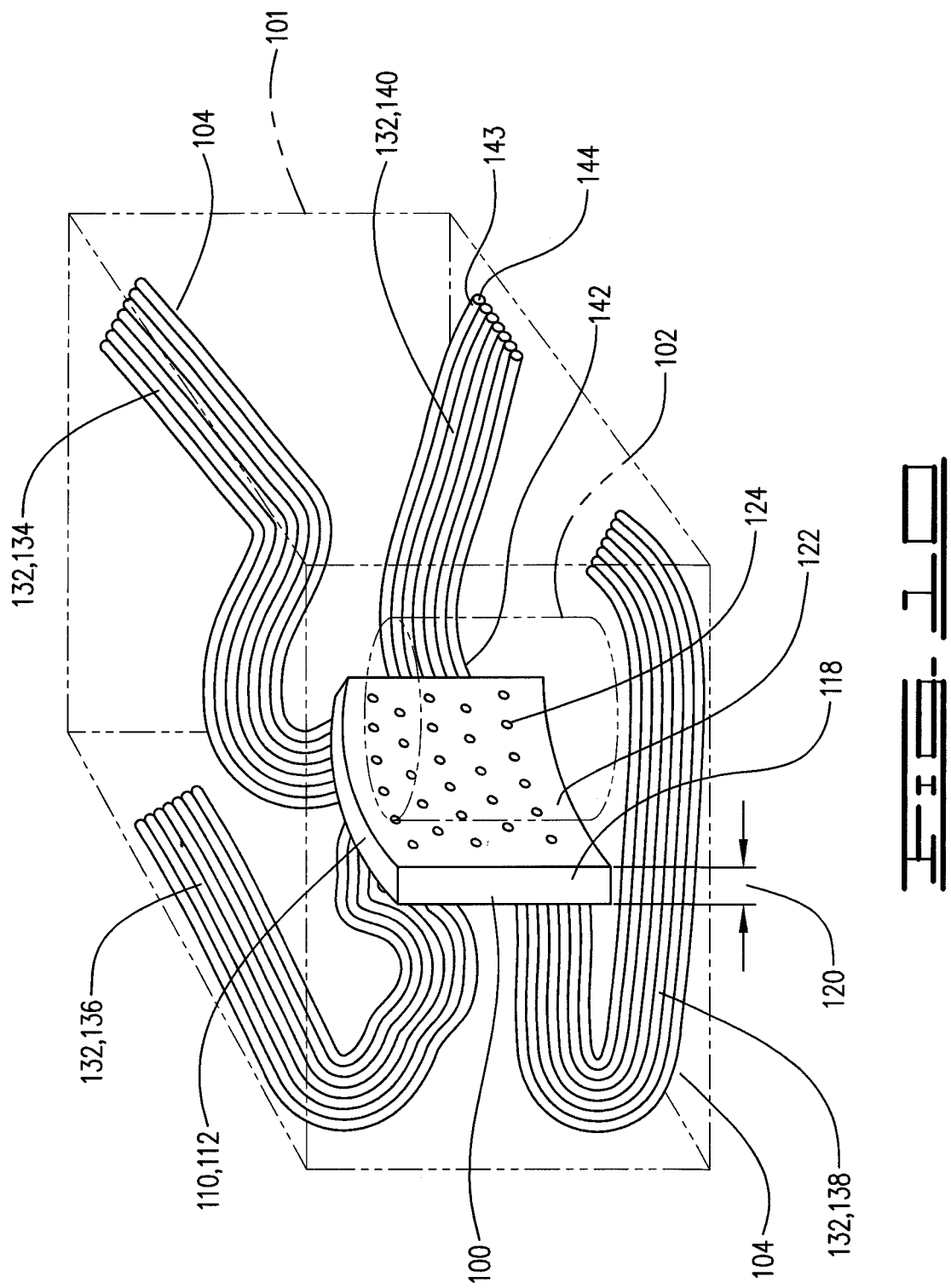
FIG. 10 is a schematic of an alternative embodiment of an acoustic damper in a noise-generating structure.
Figure 11:
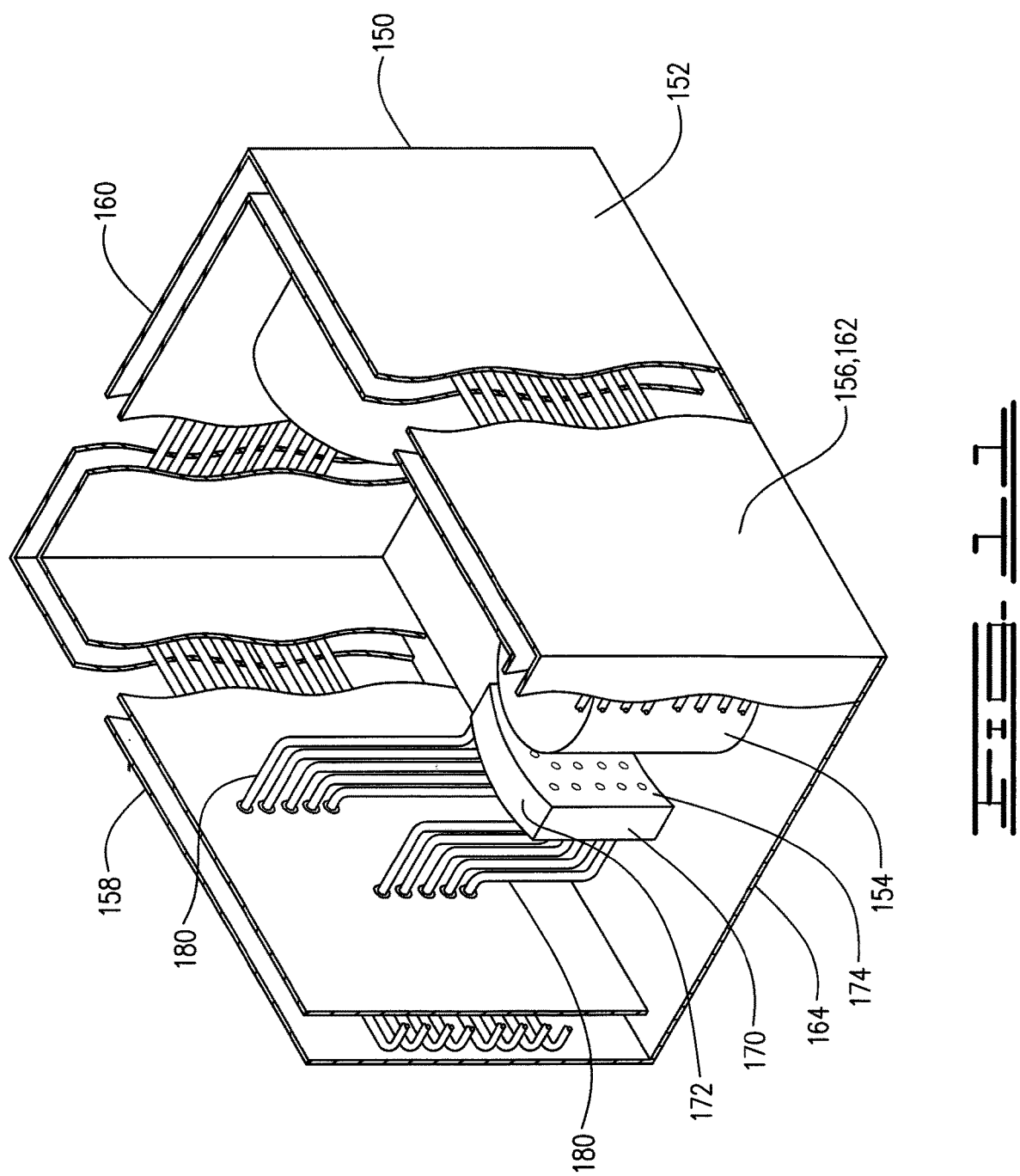
FIG. 11 is a schematic of another alternative embodiment of an acoustic damper in a noise-generating structure.
Figure 12:
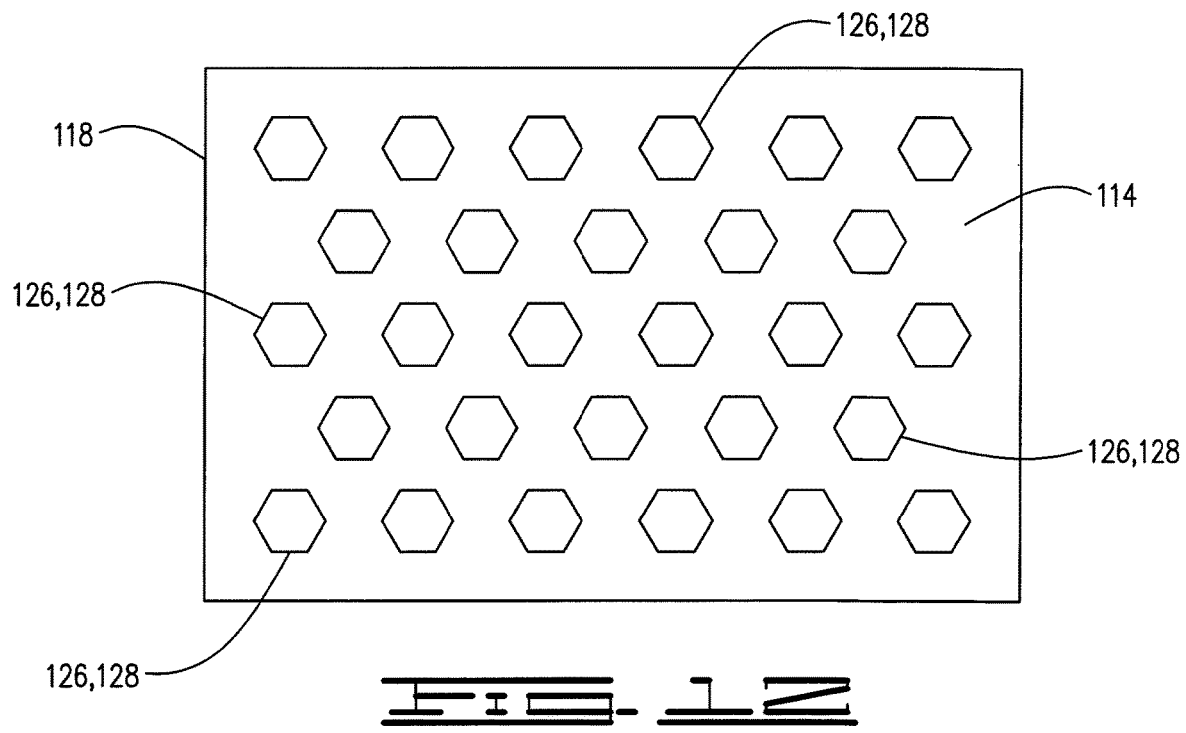
FIG. 12 is a view of the exit face of the sound pickup unit of the embodiment of FIG. 10.

In other embodiments, the acoustic damper may take different shapes. For example, in an embodiment shown in FIG. 10, an acoustic damper 100 is positioned in a noise-generating structure 101 which may be for example an air conditioner. A noise source 102, for example, a compressor in the outer housing 103 generates noise to be attenuated or mitigated. It is understood that there will be a number of other components placed in housing 103 but there will be dead or open spaces 104 therein. Acoustic damper 100 may be arcuately shaped so as to fit in a space proximate the compressor, and to more closely approximate the shape of the noise-generating source. The acoustic damper 100 in the embodiment shown in FIG. 10 includes a baffle block 112 having a top or entry face 114 (shown in a flat plan view in FIG. 12) and a bottom or exit face 116 (shown in flat plan view in FIG. 13). An edge 118 having a thickness 120 is defined between entry and exit faces 114 and 116. A face sheet 122 may be placed over top face 114. As understood and as is shown face sheet 122 will have a plurality of apertures 124 defined therethrough which will allow communication of sound waves into pickup unit passageways 126 defined through baffle block 112. The acoustic damper 100 includes the pickup unit, or baffle block 112 and face sheet 122. No additional cap is utilized, and the pickup unit comprises the baffle block 112 and the face sheet 122. Thus in the embodiment of FIG. 10 the pickup unit passageways are the baffle block passages.

Baffle block passages 126 have an entry opening 128 on entry face 114 and an exit opening 130 on exit face 116. The entry opening may be a polygonal-shaped opening and in this case a hexagonal opening as described above. The exit opening 130 may comprise a generally circular exit opening. As explained above the shape of the entry and exit openings and passages may be as desired (e.g., circular, square, other shape) for ease of construction or the application specific needs.

A plurality of flexible tubes 132 are wound into and through dead spaces 104. In the embodiment described, the plurality of flexible tubes 132 may comprise a bundle 134, bundle 136, bundle 138 and bundle 140. Bundles 134, 136, 138 and 140 in the described embodiment will have an equal number of flexible tubes 132. It is understood that the bundles may have a different number of flexible tubes. The lengths of each of flexible tubes 132 between the first end 142 and second end 143 in a bundle will generally be the same. However, as described earlier, the length of the tubes in a particular bundle can be, and in many cases will be, different than the length of the tubes in other bundles so as to address different frequencies. Thus, flexible tubes 132 in bundle 134 may have a different length than those in bundle 136 so that the acoustic path, which comprises the length of the pickup unit passageways 126 plus the length of the associated flexible tube 132, will be different. A plug 144 may be inserted into the end of the hollow flexible tubes 132. Foam inserts as previously described may likewise be included at the second end 143 of flexible tubes 132. The lengths of the hollow flexible tubes 132 may be determined based on the frequency ranges of interest as described above. The type and length of the foam inserts may also vary. Other structural acoustic inserts may also be used in the flexible tubes. Another acoustic element that may be embedded within the flexible tubes is a stretched, perforated membrane.

Figure 13:
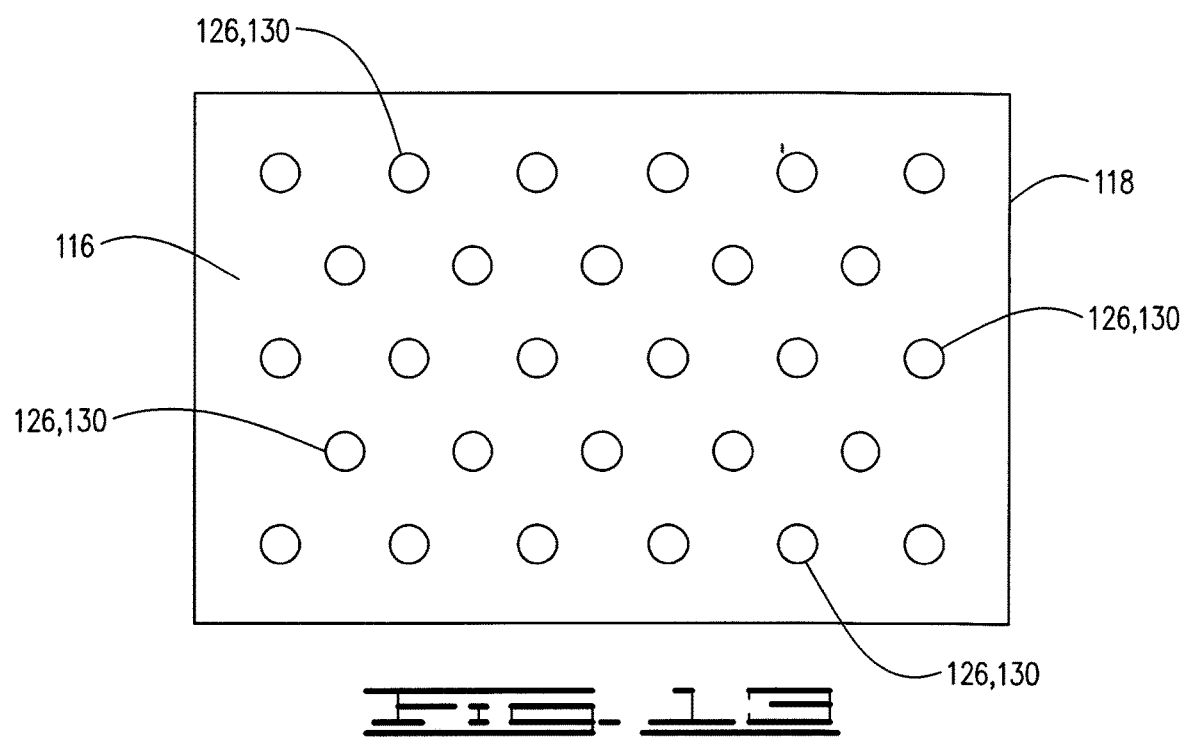
FIG. 13 is a view of the entry face of the sound pickup unit of the embodiment of FIG. 10.
Figure 16:
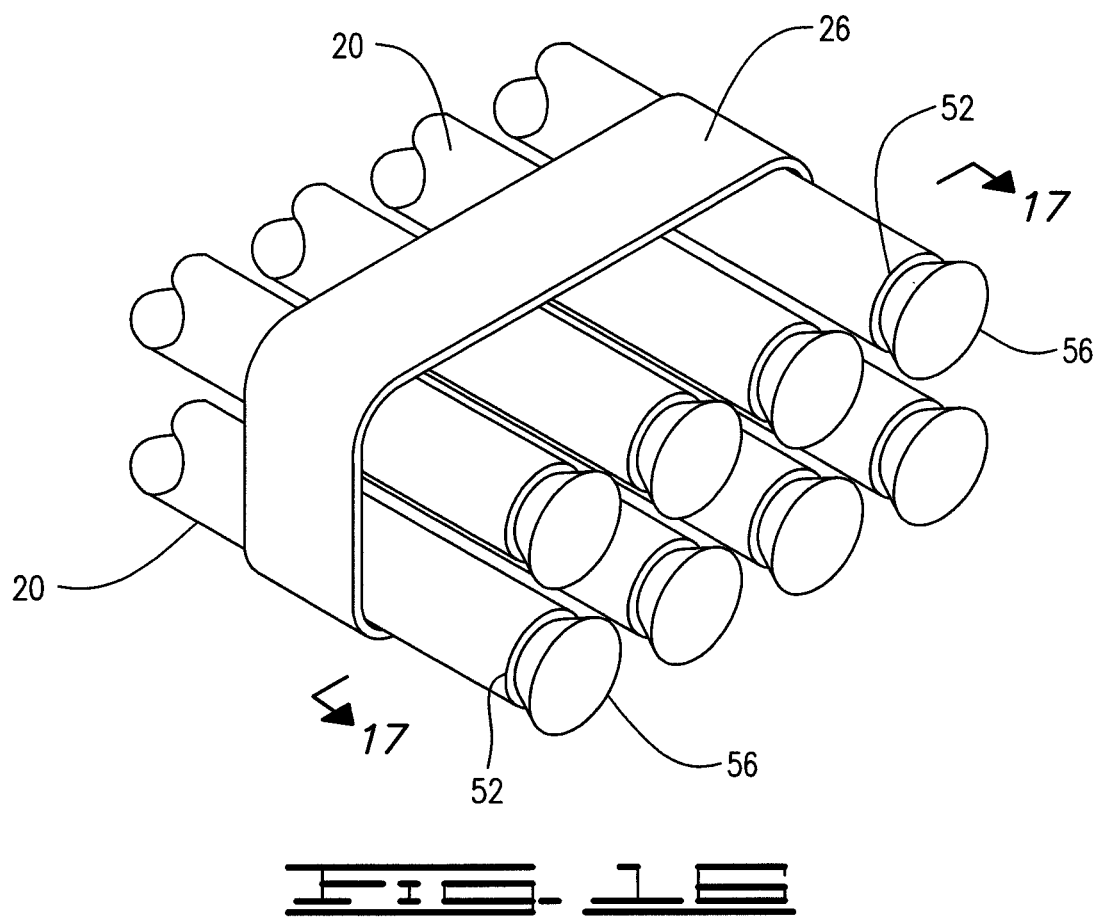
FIG. 16 is a view of the end of bundled flexible tubes.
Figure 17:
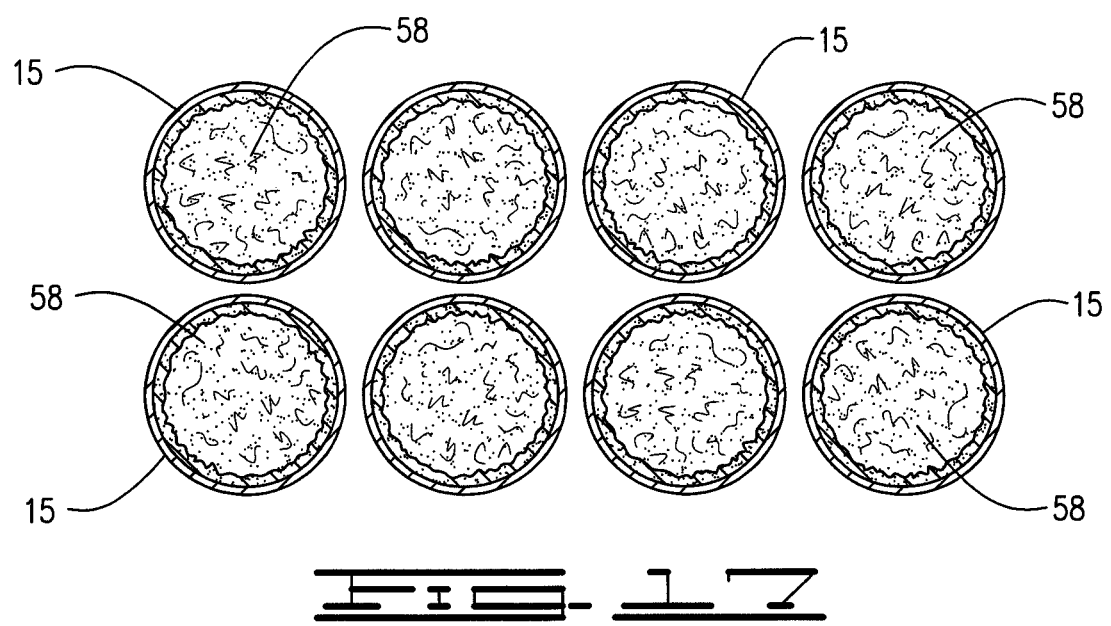
FIG. 17 is a view from line 17-17 of FIG. 16.

In an alternative embodiment, the housing of a noise-generating structure may have hollow cavities formed therein, or have hollow tubes mounted to the inner walls of the housing, and attached to a pickup unit with short hollow flexible tubes. FIG. 13 shows noise-generating structure 150 which may be for example an air conditioning unit. Air conditioning unit 150 has a housing 152 with a noise source 154, which may be for example a compressor 154. Housing 152 has outer walls 156. Outer walls 156 include front wall 158, side wall 160, rear wall 162 and bottom wall 164. Housing 152 also incudes a top wall and second side wall (not shown). An acoustic damper 170 is positioned proximate compressor 154. Acoustic damper 170 has baffle block 172 and face sheet 174, which may be for example like baffle block 112 and face sheet 122, and comprise a pickup unit 176. Pickup unit 176 has pickup unit passageways therethrough. Hollow flexible tubes 180 are connected at one end to pickup unit passageways 178 and at a second end to hollow tubes 182 positioned in walls 156. Hollow tubes 182 may be molded in or otherwise formed or placed in walls 156. Hollow tubes 182 may be of the same or varied lengths. Hollow tubes 182 may have bulk absorbers at an end thereof. Alternatively, walls 156 may have tube-like cavities formed in the walls thereof.

Another embodiment is schematically shown in FIG. 13, in which the noise-generating structure may comprise for example an aircraft engine nacelle 200 where space constraints prevent or inhibit the use of conventional acoustic dampers. In such a case, an acoustic damper 202 with a plurality of hollow flexible tubes 204 extending from a pickup unit 206 may be placed proximate a noise-generating source (not shown). Hollow flexible tubes 204 may be bundled and may be placed in existing structural pockets away from the location where baffle pickup unit 206 is placed.

Although the disclosed invention has been shown and described in detail with respect to an embodiment, it will be understood by those skilled in the art that various changes in the form and detailed area may be made without departing from the spirit and scope of this invention as claimed. Thus, the present invention is well adapted to carry out the object and advantages mentioned as well as those which are inherent therein. While numerous changes may be made by those skilled in the art, such changes are encompassed within the spirit of this invention as defined by the appended claims.

What is claimed is:

1. An acoustic damper comprising:
   a sound pickup unit defining a plurality of pickup unit passageways therethrough; and
   hollow flexible tubes connected to exit openings of the pickup unit passageways and extending outwardly therefrom, the hollow flexible tubes and pickup unit passageways defining sound attenuating acoustic paths that inhibit the flow of air therethrough.

2. The acoustic damper of claim 1, the pickup unit comprising:
   a cap defining a plurality of generally straight cap passageways with an entry opening and an exit opening; and
   a baffle block connected to the cap, the baffle block defining a plurality of baffle block passages with an entry opening and an exit opening, the cap passageways communicated with the baffle block passages, wherein the cap passageways and baffle block passages define the pickup unit passageways, the flexible hollow tubes being connected to the baffle block exit openings.

3. The acoustic damper of claim 2, the pickup unit further comprising a face sheet covering the cap, the face sheet having face sheet apertures communicated with the pickup unit passages.

4. The acoustic damper of claim 1, the hollow flexible tubes comprising tubes of different lengths.

5. The acoustic damper of claim 1, the hollow flexible tubes comprising a plurality of bundles of flexible hollow tubes.

6. An air conditioning unit comprising:
   an outer housing;
   a compressor positioned in the outer housing; and
   the acoustic damper of claim 1 positioned in the housing.

7. The air conditioning unit of claim 6, the pickup unit positioned proximate to the compressor and the hollow flexible tubes positioned in dead spaces in the housing.

8. An acoustic damper for attenuating sound generated by a noise generating source comprising:
   a cap defining a plurality of cap passageways;
   a baffle block connected to the cap, the baffle block having a plurality of baffle block passages communicated with the cap passageways, the cap passageways and baffle block passages defining pickup unit passageways; and
   a plurality of hollow flexible tubes connected to an exit of the pickup unit passageways, the plurality of flexible tubes comprising flexible tubes of different lengths, each of the flexible tubes and the pickup unit passageway to which it is connected comprising an acoustic path, wherein the hollow flexible tubes are not fluidicly communicated with the noise generating source.

9. The acoustic damper of claim 8, the flexible tubes comprising a plurality of bundles of hollow flexible tubes, each bundle comprising a plurality of hollow flexible tubes having the same length.

10. The acoustic damper of claim 8, comprising a face sheet positioned on an entry face of the cap, the face sheet having face sheet openings communicated with the pickup unit passageways.

11. The acoustic damper of claim 8, the baffle block comprising:
    an entry face;
    an exit face; and
    an outer peripheral edge having a thickness extending between the entry and exit faces, the baffle block passages having an entry opening on the entry face, and an exit opening at the outer peripheral edge, the baffle block exit opening comprising the pickup passageway exit opening.

12. A noise-generating structure comprising:
    an outer housing;
    a noise source positioned in the housing; and
    the acoustic damper of claim 9 positioned in the housing proximate the noise source.

13. The noise-generating structure of claim 12, wherein the structure comprises an air conditioning unit and the noise source comprises a compressor.

14. The noise-generating structure of claim 12, wherein the housing comprises an aircraft nacelle and the noise source is a turbine in the nacelle.

15. An acoustic damper comprising:
    a rigid pickup unit having a plurality of sound pickup passages therethrough;
    a plurality of hollow flexible tubes connected to the rigid pickup unit, the pickup passages communicated with the hollow flexible tubes to define a plurality of sound attenuating acoustic pathways;
    a plug closing off an outward end of the flexible tubes; and
    a bulk absorber filling a portion of the hollow flexible tube at the outward end thereof.

16. The acoustic damper of claim 15, the pickup unit comprising:
    a cap unit defining cap passages having an entry opening and an exit opening; and
    a baffle block connected to the cap, the baffle block defining baffle block passages communicated with the flexible tubes.

17. The acoustic damper of claim 15, the pickup unit passages having a polygonal shape.

18. The acoustic damper of claim 15, the plurality of acoustic paths having different lengths such that noise in a range of frequencies is attenuated.

19. An air conditioning unit comprising:
    an outer housing;
    a compressor in the outer housing; and
    the rigid pickup unit of claim 15 positioned proximate the compressor.

20. The air conditioner of claim 19, the rigid pickup unit having an arcuate shape.

21. The air conditioning unit of claim 19, the housing defining a plurality of cavities therein, the flexible tubes being connected to the hollow cavities.

* * * * *